United States Patent [19]

Rundlöf

[11] 4,237,412
[45] Dec. 2, 1980

[54] VOLTAGE REGULATOR FOR A GENERATOR

[75] Inventor: Lars N. Rundlöf, Västra Frölunda, Sweden

[73] Assignee: AB Volvo, Goteborg, Sweden

[21] Appl. No.: 882,897

[22] Filed: Mar. 2, 1978

[30] Foreign Application Priority Data

Mar. 9, 1977 [SE] Sweden .................. 7702656

[51] Int. Cl.³ .............................................. H02J 7/14
[52] U.S. Cl. .................................... 322/28; 320/64; 322/33
[58] Field of Search ........... 322/28, 33, 34; 320/35, 320/36, 64, 68

[56] References Cited

U.S. PATENT DOCUMENTS

| | | | |
|---|---|---|---|
| 2,118,558 | 5/1938 | Hanson et al. | 320/43 |
| 3,600,661 | 8/1971 | Briggs et al. | 322/33 X |
| 3,652,915 | 3/1972 | Eberts et al. | 320/39 X |
| 3,683,259 | 8/1972 | Allport | 322/28 X |
| 3,868,558 | 2/1975 | Winkley et al. | 320/37 |
| 4,100,475 | 7/1978 | Gansert et al. | 320/35 |
| 4,128,799 | 12/1978 | Morishima | 322/28 |
| 4,136,311 | 1/1979 | Scheidler | 322/28 |

FOREIGN PATENT DOCUMENTS 2535245 2/1977 Fed. Rep. of Germany.
362172 11/1973 Sweden.
1302204 1/1973 United Kingdom.

*Primary Examiner*—Robert J. Hickey
*Attorney, Agent, or Firm*—Young & Thompson

[57] ABSTRACT

A voltage regulator intended for a car generator in order to give an appropriate charging voltage which can be compensated for variations in ambient temperature or the like. An advantage of the present regulator is that it may be used with or without an external regulator element, the switching-in of this external element being compensated by the automatic switching-in of a balancing resistor.

4 Claims, 4 Drawing Figures

VOLTAGE REGULATOR FOR A GENERATOR

In motor vehicles the storage battery is usually fed from a generator whose output voltage is regulated by a so-called charging regulator. This voltage somewhat exceeds the rated voltage of the battery. Normally this regulation is done by affecting the current in the field windings of the generator. This applies in principle to both direct current and alternating current generators.

Regulators of this type are known in which a certain portion of the output voltage is compared with a reference voltage, which is now usually a Zener voltage. The regulator is usually mounted next to the battery or, as has recently been the case, is incorporated into the generator itself.

Regulators, for a long time now, have been made temperature-sensitive, so that a low temperature will increase the voltage, thus supplying more charging current to the battery. This can be done by, for example, connecting in series the Zener diode providing the voltage reference, with one or more forward biased diodes (Bosch) or by making a resistance in the voltage divider temperature-sensitive (Motorola). A disadvantage of the built-in regulator is that the temperature which determines the generator voltage will not be the prevailing battery temperature but rather the temperature in the engine bay or even the temperature of the generator.

In a system marketed by Lucas, a temperature sensor is incorporated in the regulator circuit. The temperature sensor is disposed next to the battery. Thus a more relevant temperature will determine the operation, so that a cold climate will be accompanied by more powerful charging of the battery. Correspondingly, in a warm climate the voltage will be reduced. This is also an advantage since in tropical climates in normal devices it is easy to get too powerful a charging voltage so that the battery becomes overcharged and develops gas, causing water loss in the battery. This Lucas system is, however, an alternative system which must be installed in place of the standard regulator system put in when the vehicle was assembled, and therefore it can be considered in a certain sense to be exclusive.

It is a purpose of the present invention to achieve a voltage regulator for standard assembly, which can be easily supplemented with additional regulating elements. If the purpose is to achieve climate compensation, this can be done by a temperature sensor which can be placed at any location but preferably in the vicinity of the battery. A suitable placement is immediately under the battery.

However, the invention is not limited to regulation of the generator voltage with respect to the prevailing temperature. In certain cases, for example, it can be desirable to read the degree of charge of the battery, preferably by sensing the density of the battery electrolyte. Another embodiment is conceivable in which the additional regulator element causes a change in the voltage to which the regulation is done, and a simple switch means is conceivable in the additional regulator element so that one can switch manually to a summer position with lower generator voltage and a winter position with higher generator voltage.

In direct current generators it is understood that the generator voltage means quite simply the voltage at the terminals (output voltage). It is obvious for the person skilled in the art that the invention can also be applied to alternating current generators which are provided with rectifying means, so that the voltage at the terminal of this system is considered to be the generator voltage in the sense intended in the present description.

The above-mentioned purposes and advantages, as well as other advantages and characteristics as described in the following description, are achieved according to the invention with a voltage regulator which has the characteristics disclosed hereinafter.

A better understanding of the invention can be provided by the following description of two non-limiting embodiments in connection with the figures.

Two embodiments of the invention will now be described with reference to FIGS. 1 and 2, in which the invention is employed with different types of field winding connections. Both of these connecting systems are commercially available.

Figure 1:
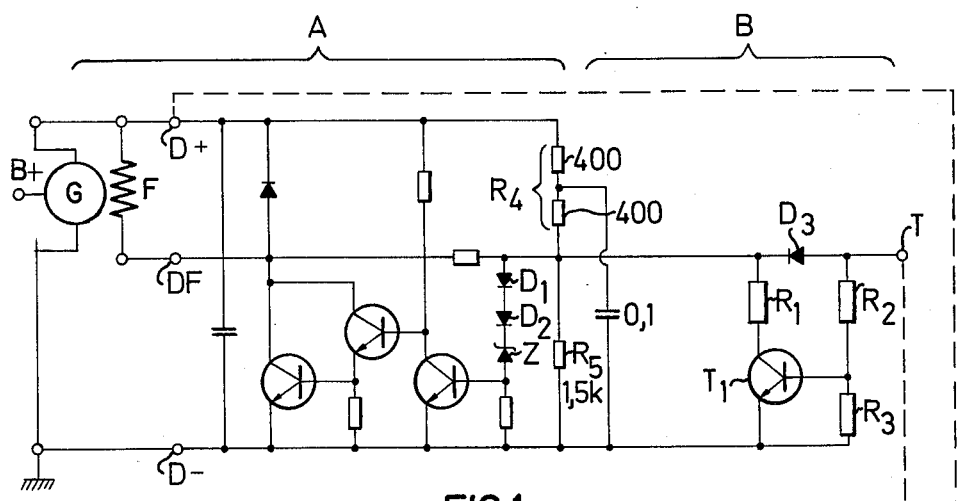
FIG. 1 shows an example of a connected voltage regulator, in which the field winding F is connected to the positive pole.

The wiring diagram in FIG. 1 comprises a part A and a part B, part A being a voltage regulator of standard type (e.g. Bosch EE 14 V 3). Since wiring A is known to the person skilled in the art, a brief description will suffice here of that which is of specific interest for the present invention. The voltage divider chain $R_4$–$R_5$ is connected across the regulated voltage. The voltage drop across the resistance $R_5$ is compared to the Zener voltage, and the transistor circuits will then regulate the voltage in the field winding to the generator G by regulating the generator voltage to a certain value. Because of the temperature dependence of the Zener diode Z and the diodes $D_1$ and $D_2$, the required voltage will be dependent on the temperature.

The inventive improvement is achieved by the additional components designated B. They comprise a transistor circuit and an additional regulator element $R_T$, which in the case shown is a resistance means according to FIG. 1A, whose resistance varies with the temperature. This temperature-sensitive resistance unit is placed right next to the battery and is coupled between D+ and point T. In operation a current will go from the battery via D+ and on through the resistance chain $R_2$–$R_3$, so that the base of the transistor $T_1$ receives a voltage and becomes conductive. Thus the transistor $T_1$ functions as a switch which is closed when the resistance $R_T$ is switched in. Because of the existence of the diode $D_3$, the switching-out of $R_T$ will result in the voltage divider $R_2$–$R_3$ being currentless, so that $T_1$ is non-conducting. If $R_3$ is switched out, part B of the voltage regulator will be inactive. When $R_T$ is switched in, the voltage divider $R_4$–$R_5$, whereby the voltage is sensed, will be replaced by $R_4$ and $R_T$ coupled in parallel and $R_5$ and $R_1$ coupled in parallel. This disregards the minor voltage drops in the semiconductor components.

To obtain full compatability it is advisable to design $R_1$ and $R_T$ so that at a certain temperature, 25° C. for example, the switching-in of $R_T$ will not cause an appreciable change in the voltage from the generator. This can be done by making the ratios $R_4/R_5$ and $R_T/R_1$ approximately equal at this temperature.

To assure that the diode $D_3$ will conduct when $R_T$ is switched in, $R_T$ should have a lower impedance than $R_4$. ($R_2$ and $R_3$ are relatively large.)

Figure 1A:
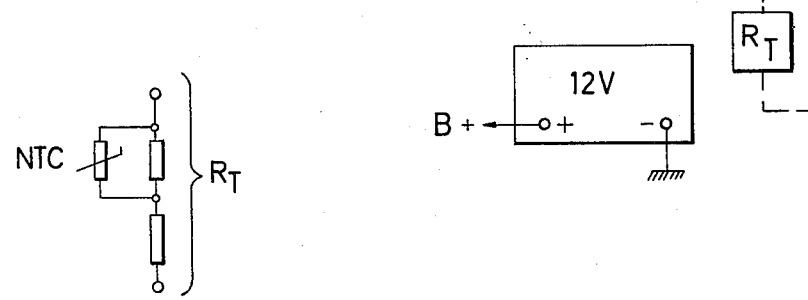
FIG. 1A shows an example of a regulator element.

An example of a suitable resistor circuit for the regulator element $R_T$ is shown in FIG. 1A, although in many cases a simple NTC resistor can serve the same purpose.

Figure 2:
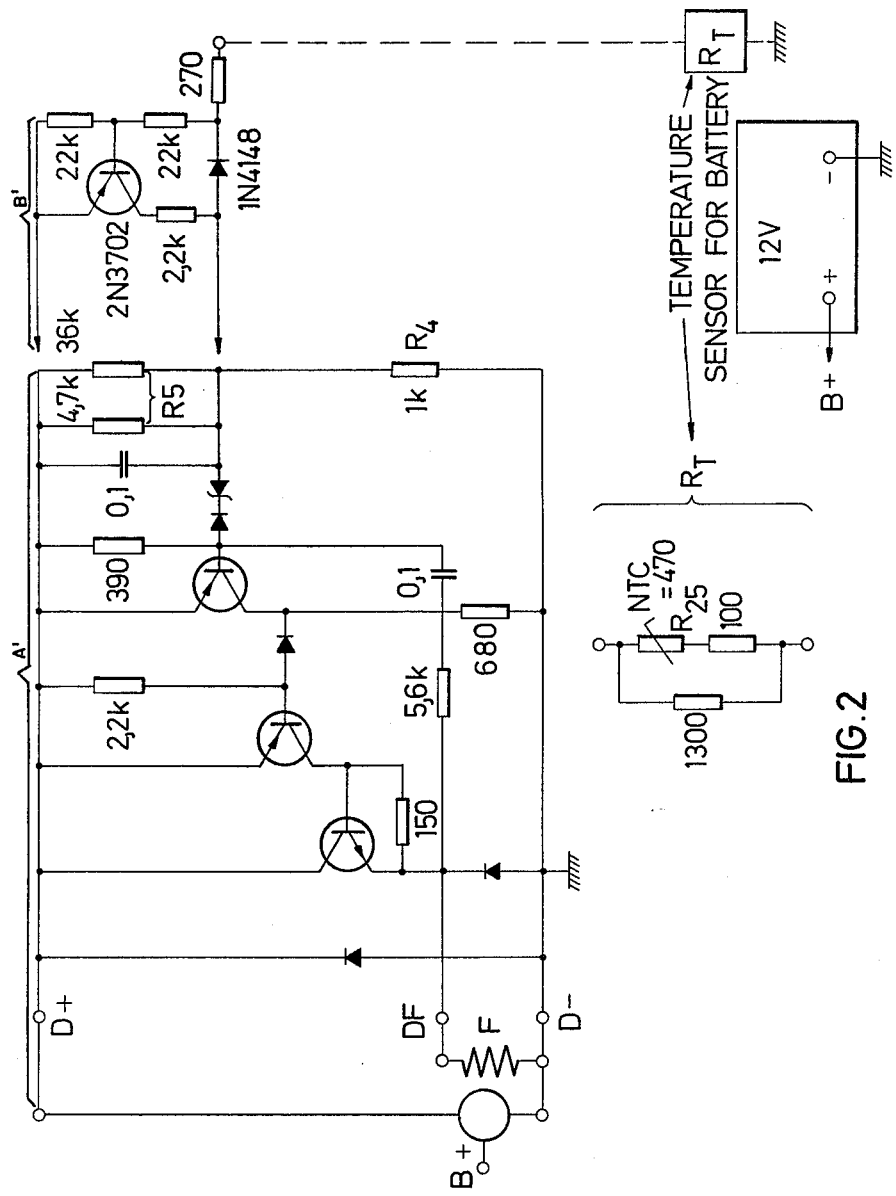
FIG. 2 shows a voltage regulator in which the field winding F is connected to the negative pole.

FIG. 2 shows another embodiment in which the field winding F is connected to the negative pole. As in the preceding case the circuit can be divided into a part A' of previously known type (e.g. a Bosch ED 14 V 3 regulator) and a part B' which is similar to part B according to FIG. 1. Since part A' of the circuit is well-known to the person skilled in the art, we need only to state that its operation is somewhat analogous, with the voltage divider $R_4$–$R_5$ fulfilling the same function as in the preceding example. This also applies to the Zener diode Z and the diode $D_1$ which is connected in series therewith; and in part B' have been given the same reference numerals, one can see that the functioning of the different components connected with the invention is mutatis mutandis rather similar.

Figure 3:
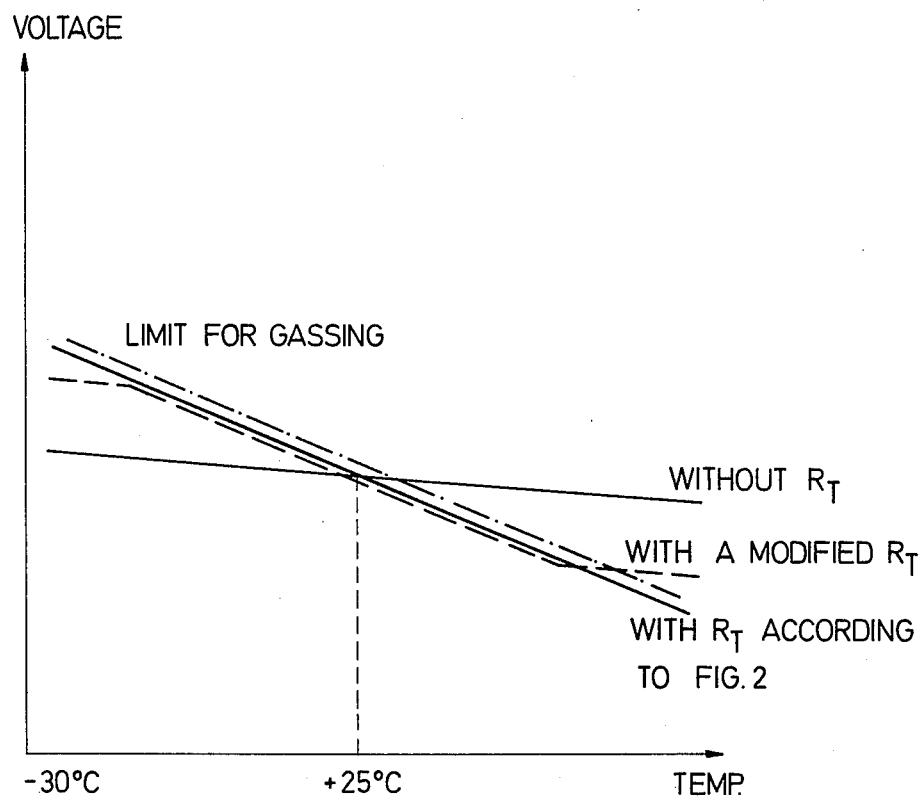
FIG. 3 shows examples of the effect of coupling-in of a temperature-sensing regulating element, as compared to when it is not connected.

FIG. 3 shows the effect of the switching-in of the resistance unit $R_T$, and is applicable to both of the embodiments. When no unit $R_T$ is switched in, a temperature regulation is obtained which is relatively weakly dependent on the temperature. Since it is not certain then that the temperature sensed corresponds to the battery temperature, if there were a stronger temperature dependence there would be danger of having an output voltage which is much too erroneous. Since $R_T$ (according to FIGS. 1 and 2) senses the temperature of the battery, one can risk selecting an $R_T$ which, when switched in, gives a significantly more temperature-dependent output voltage. FIG. 3 also shows the effect of a modified $R_T$. This temperature dependence can be achieved with the aid of a pair of Zener diodes, for example. A conceivable reason for not desiring too large a variation of the output voltage is the effect on the effectivity and life of incandescent lamps.

What I claim is:

1. A voltage regulator for a generator of the type used in motor vehicles, the regulator being adapted to set, in use, the generator at a charging voltage when charging a storage battery, the regulator comprising a voltage divider ($R_4$, $R_5$) having a pair of branches for sensing the voltage of a generator (G) and comparing such voltage with a reference voltage (Z); switch means ($T_1$); an additional voltage divider element ($R_1$) connected in one branch ($R_5$) of the first-mentioned voltage divider ($R_4$, $R_5$) through said switch means ($T_1$) and only when said switch means ($T_1$) is rendered operative; terminal means (T) for connecting a regulator element ($R_T$) in the other branch ($R_4$) of said first-mentioned voltage divider ($R_4$, $R_5$); and means ($R_2$, $R_3$) for rendering operative said switch means ($T_1$) to connect said additional voltage divider element ($R_1$) in said one branch ($R_5$) of the voltage divider, only when a said regulator element ($R_T$) is connected to said terminal means (T).

2. A voltage regulator as claimed in claim 1, in which said switch means is a switch transistor ($T_1$) coupled in series with said additional voltage divider element ($R_1$), said means for rendering operative said switch means comprising a second voltage divider ($R_2$, $R_3$) coupled to said terminal means (T), and a diode ($D_3$) by which the terminal means (T) is connected to the first-mentioned voltage divider ($R_4$, $R_5$), said diode ($D_3$) being connected with regard to its polarity so that, when a said regulator element ($R_T$) is not connected to the terminal means (T), the diode ($D_3$) prevents current from the first-mentioned voltage divider ($R_4$, $R_5$) from reaching the second voltage divider ($R_2$, $R_3$) so that the switch transistor ($T_1$) remains inoperative.

3. A voltage divider as claimed in claim 1, in combination with a said regulator element ($R_T$) connected to said terminal means (T), the regulator element being a temperature-sensitive element adapted to be mounted next to a storage battery to adjust the generator voltage so that the generator voltage is adapted to the temperature of the storage battery.

4. A voltage regulator as claimed in claim 2, in combination with a said regulator element ($R_T$) connected to said terminal means (T), the regulator element being a temperature-sensitive element adapted to be mounted next to a storage battery to adjust the generator voltage so that the generator voltage is adapted to the temperature of the storage battery.

* * * * *